(12) United States Patent
Jampala et al.

(10) Patent No.: US 12,520,173 B2
(45) Date of Patent: Jan. 6, 2026

(54) TRIGGERING NETWORK REDUNDANCY BASED ON LOOPBACK MESSAGING

(71) Applicant: Rakuten Symphony, Inc., Tokyo (JP)

(72) Inventors: Naga Krishna Prasad Jampala, Bangalore (IN); Nirav Salot, Bangalore (IN); Yassar Sharaafath Chennampillil Ahamadkutty, Bangalore (IN); Ronak Lalwala, Bangalore (IN); Mahesh Sivapuram, Bangalore (IN); Lokesh Chimbili, Bangalore (IN); Prasad Hiremath, Bangalore (IN); Hari Swaroop Kanzal Venkatesha, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 481 days.

(21) Appl. No.: 18/124,875

(22) Filed: Mar. 22, 2023

(65) Prior Publication Data

US 2024/0323715 A1   Sep. 26, 2024

(51) Int. Cl.
*H04W 24/04* (2009.01)
*H04W 4/12* (2009.01)

(52) U.S. Cl.
CPC .............. *H04W 24/04* (2013.01); *H04W 4/12* (2013.01)

(58) Field of Classification Search
CPC ....... H04W 4/12; H04W 24/04; H04W 72/21; H04W 76/10; H04W 76/12
See application file for complete search history.

(56) References Cited

U.S. PATENT DOCUMENTS

| | | | |
|---|---|---|---|
| 12,407,448 B2 * | 9/2025 | Rama Chandran ... | H04L 1/1607 |
| 2022/0345896 A1 * | 10/2022 | Ahmed ................ | H04W 24/02 |
| 2023/0208559 A1 * | 6/2023 | Rama Chandran ... | H04L 1/1671 370/328 |
| 2023/0325706 A1 * | 10/2023 | Kesavareddigari .... | H04B 7/088 706/12 |
| 2024/0031978 A1 * | 1/2024 | Manolakos ............ | H04W 64/00 |
| 2024/0040419 A1 * | 2/2024 | Yu ....................... | H04W 36/0085 |
| 2024/0049046 A1 * | 2/2024 | Kodaypak ............. | H04W 28/0278 |
| 2025/0133424 A1 * | 4/2025 | Tamura ................ | H04W 24/04 |

OTHER PUBLICATIONS

O-RAN Working Group 4 (Open Fronthaul Interfaces WG), Control, User and Synchronization Plane Specification, Jul. 23, 2022.
O-RAN Working Group 4 (Open Fronthaul Interfaces WG), Management Plane Specification, Aug. 15, 2022.

* cited by examiner

*Primary Examiner* — Congvan Tran
(74) *Attorney, Agent, or Firm* — Sughrue Mion, PLLC

(57) ABSTRACT

In general, the current subject matter relates to triggering network redundancy based on LBM. In some implementations, triggering network redundancy based on LBM can include, via a DU, transmitting an LBM data request to an RU, receiving an LBM data response from the RU, enabling user plane communications with the RU based on receiving the LBM data response, transmitting, based on the established periodicity, a second LBM data request based on a MAC address to a plurality of RUs including the RU, marking the RU as non-responsive when a second LBM data response to the second LBM data request from the RU is not received or the second LBM data response indicates an issue for a consecutive number of times, and establishing a second MAC address for communicating with the plurality of RUs when each of the plurality of RUs are marked as non-responsive.

20 Claims, 16 Drawing Sheets ns digital
TRIGGERING NETWORK REDUNDANCY BASED ON LOOPBACK MESSAGING

TECHNICAL FIELD

The present disclosure relates to triggering network redundancy based on loopback messaging (LBM).

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

In an open radio access network, communications via the fronthaul network can be synchronized in time and frequency by synchronizing clocks of devices that communicate via the fronthaul network. The synchronization can allow messages communicated via the fronthaul network to be sent and received properly. The synchronization can be achieved using a timing grandmaster to which the clocks are synchronized. However, if the timing grandmaster fails, synchronization may also fail and thereby jeopardize proper communications on the fronthaul network.

SUMMARY

In some implementations, the current subject matter relates to a computer-implemented method. The method can include transmitting, via a distributed unit (DU), a first loopback message (LBM) data request to a first radio unit (RU), receiving, via the DU, a first LBM data response from the first RU, enabling, via the DU, user plane communications with the first RU based on receiving the first LBM data response, transmitting, via the DU and based on an established periodicity, a second LBM data request based on a first media access control (MAC) address to a plurality of RUs including the first RU, marking, via the DU, the first RU as non-responsive when a second LBM data response to the second LBM data request from the first RU is not received or the second LBM data response indicates an issue a consecutive predetermined number of times, and establishing, via the DU, a second MAC address for communicating with the plurality of RUs when each of the plurality of RUs are marked as non-responsive, with the second MAC address being different from the first MAC address. Enabling the user plane communications can include establishing the periodicity of LBM messaging with the first RU.

The method may allow for identifying and remedying problematic DUs, RUS, and/or MAC addresses, such as by switching to a new MAC address.

In some implementations, the current subject matter can include one or more of the following optional features.

In some implementations, enabling the user plane communications can include establishing the predetermined number of times with the first RU.

In some implementations, the DU can include at least one baseband unit configured for control plane communications and the user plane communications with the plurality of RUs over a fronthaul (FH) interface within an Open Radio Access Network (O-RAN) architecture. In related implementations, the first LBM data request can be transmitted to the first RU via the at least one baseband unit, the first LBM data response can be received from the first RU via the at least one baseband unit, and/or the second LBM data request can be transmitted to the plurality of RUs via the at least one baseband unit.

In some implementations, the DU can include an RU manager unit configured for management plane communications with the plurality of RUs over the FH interface. In related implementations, the user plane communications with the first RU can be enabled via the RU manager unit, the first RU can be marked as non-responsive via the RU manager unit, and the second MAC address can be established for communicating with the plurality of RUs via the RU manager unit.

In some implementations, the method can further include transmitting a parameter request to the at least one baseband unit via the RU manager unit, receiving a parameter response responsive to the parameter request from the at least one baseband unit via the RU manager unit, transmitting a carrier configuration to the first RU via the RU manager unit based on a third MAC address, and/or receiving a carrier configuration confirmation from the first RU via the RU manager unit. In related implementations the parameter response can include the first MAC address of the DU and the third MAC address of the first RU and/or the first LBM data request can be transmitted after receiving the carrier configuration confirmation.

In some implementations, the method can further include transmitting a first LBM check to the at least one baseband unit via the RU manager unit, receiving an acknowledgment responsive to the first LBM check from the at least one baseband unit via the RU manager unit, transmitting a first LBM query request to the first RU via the RU manager unit a first predetermined time after receiving the first acknowledgment, and/or receiving a first LBM query response responsive to the first LBM query request from the first RU via the RU manager unit. In related implementations the first LBM data request can be transmitted to the first RU based on the first LBM check, the first LBM query response indicates whether the first LBM data response was received from the first RU, and/or enabling the user plane communications with the first RU can be based on receiving the first LBM query response.

In some implementations, the method can further include transmitting a second LBM check to the at least one baseband unit via the RU manager unit, transmitting a second LBM query request to the first RU via the RU manager unit a second predetermined time after transmitting the second LBM check, and/or receiving a second LBM query response responsive to the second LBM query request from the first RU via the RU manager unit. In related implementations, the second LBM data request can be transmitted to the first RU based on the second LBM check, enabling the user plane communications can include establishing the second predetermined time with the first RU, and/or the second LBM query response can indicate whether the second LBM data response was received from the first RU.

In some implementations, the method can further include transmitting a suspension message to a system manager unit via the DU to suspend communications with the first RU when the first RU is marked as non-responsive, transmitting a restore message to a system manager unit via the DU to restore communications with the first RU when the second LBM data response is received and indicates a status of communications with the first RU is okay, and/or transmitting an interface switch message to the system manager unit via the DU to indicate communications with the plurality of RUs has switched to the second MAC address when each of the plurality of RUs are marked as non-responsive.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

Figure 1A:
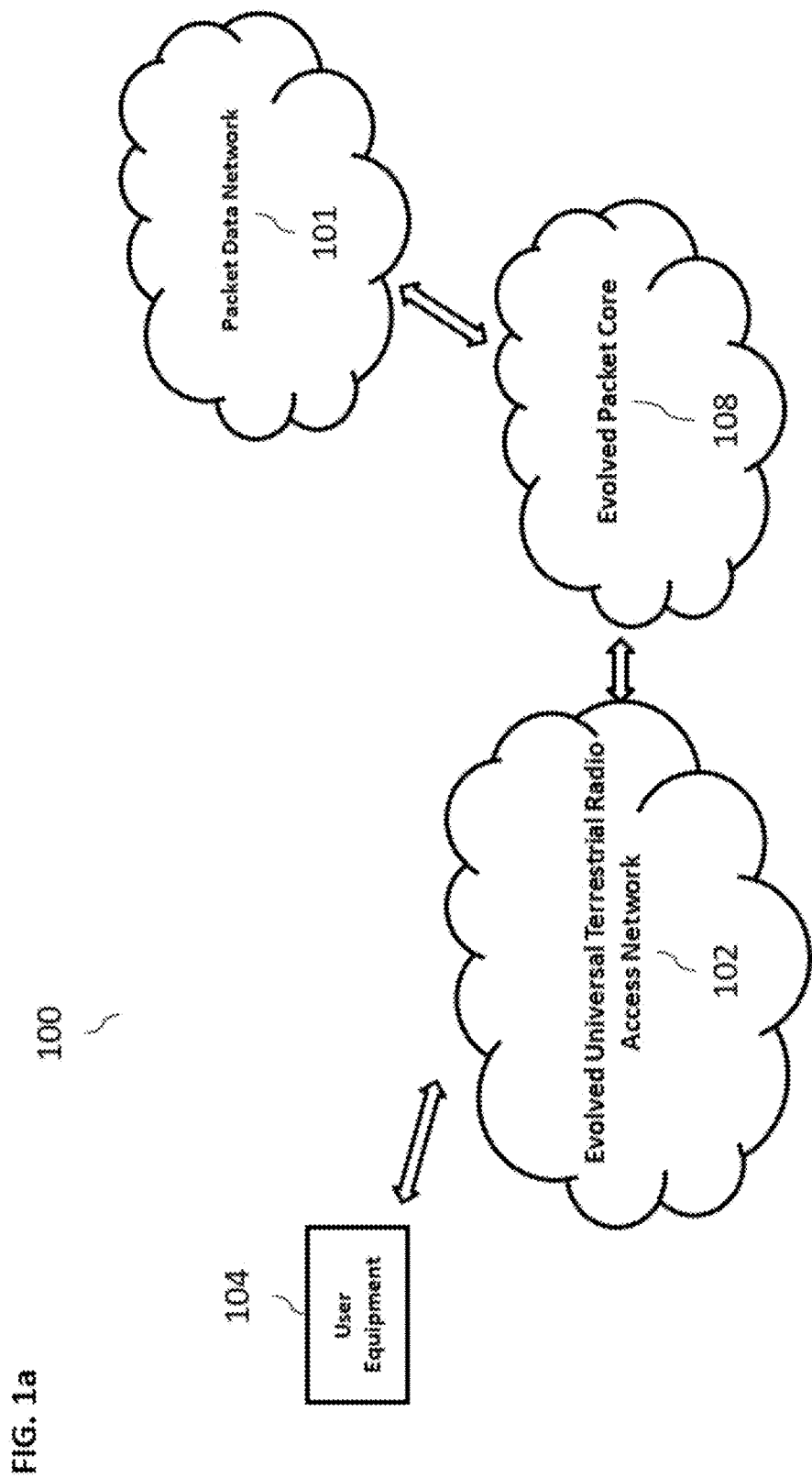
FIG. 1a illustrates an exemplary conventional long term evolution ("LTE") communications system.

The current subject matter can provide for systems and methods that can be implemented in wireless communications systems. Such systems can include various wireless communications systems, including 5G New Radio communications systems, long term evolution communication systems, etc.

In general, the current subject matter relates to triggering network redundancy based on loopback messaging (LBM). Although LBM is illustrated and described, other messaging protocols can be used, such as any messaging protocol that includes structured or unstructured data.

In some implementations of the current subject matter, a distributed unit (DU) can determine whether each of a plurality of radio units (RU) are properly communicating with the DU, such as based on periodically transmitting LBM messages to each of the plurality of RUs. For example, the DU can periodically transmit LBM data requests, and when an individual RU does not respond within a predetermined time and/or otherwise indicates an issue with communication (e.g., with the DU or otherwise), the DU can track this information. If the RU does not properly respond for a consecutive number of times, based on the tracked information, the DU can mark the individual RU as non-responsive. If the individual RU later becomes responsive, the DU can resume communications with the individual RU. However, if all of the plurality of RUs in communication with the DU are marked as non-responsive, this can indicate there is an issue with the DU, an issue with the fronthaul (FH) network, and/or the like. Accordingly, the DU can reestablish communications with the plurality of RUs based on a new media access control (MAC) address. The LBM data requests and responses between the DU and RU can be control plane messages within an O-RAN architecture, such as over the architecture's FH network. Other messages, such as those for (re)establishing, terminating, and suspending communications can be management plane messages over the FH network. Within the DU, a system manager unit and at least one baseband unit can handle transmission, receipt, and processing of the LBM messaging.

Such methods can allow for identifying and remedying problematic DUs, RUs, and/or MAC addresses, such as by switching to a new MAC address. However, such switching of MAC addresses is not currently supported by O-RAN, requiring manual diagnosis and/or switching.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-1c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1B:
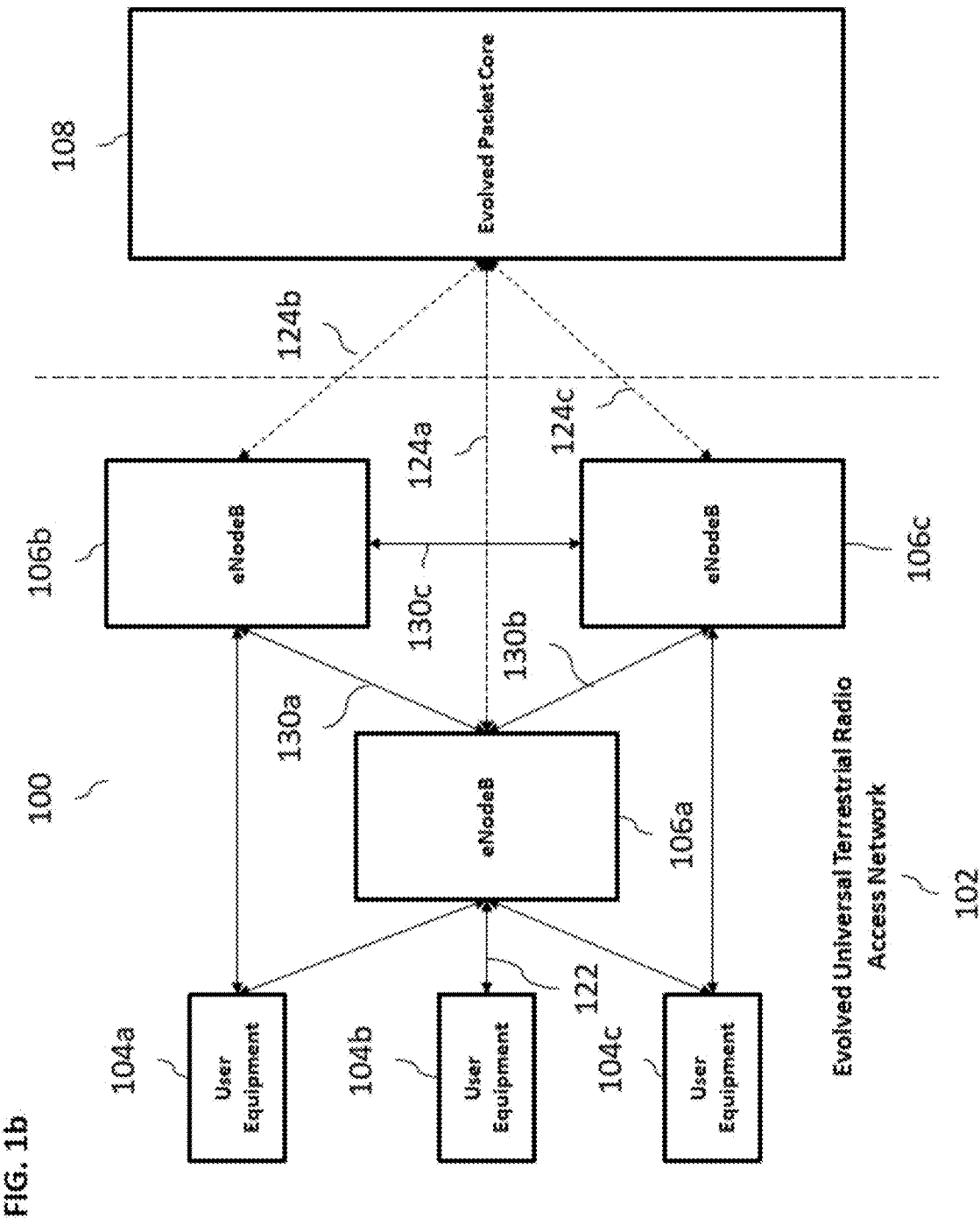

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106(a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
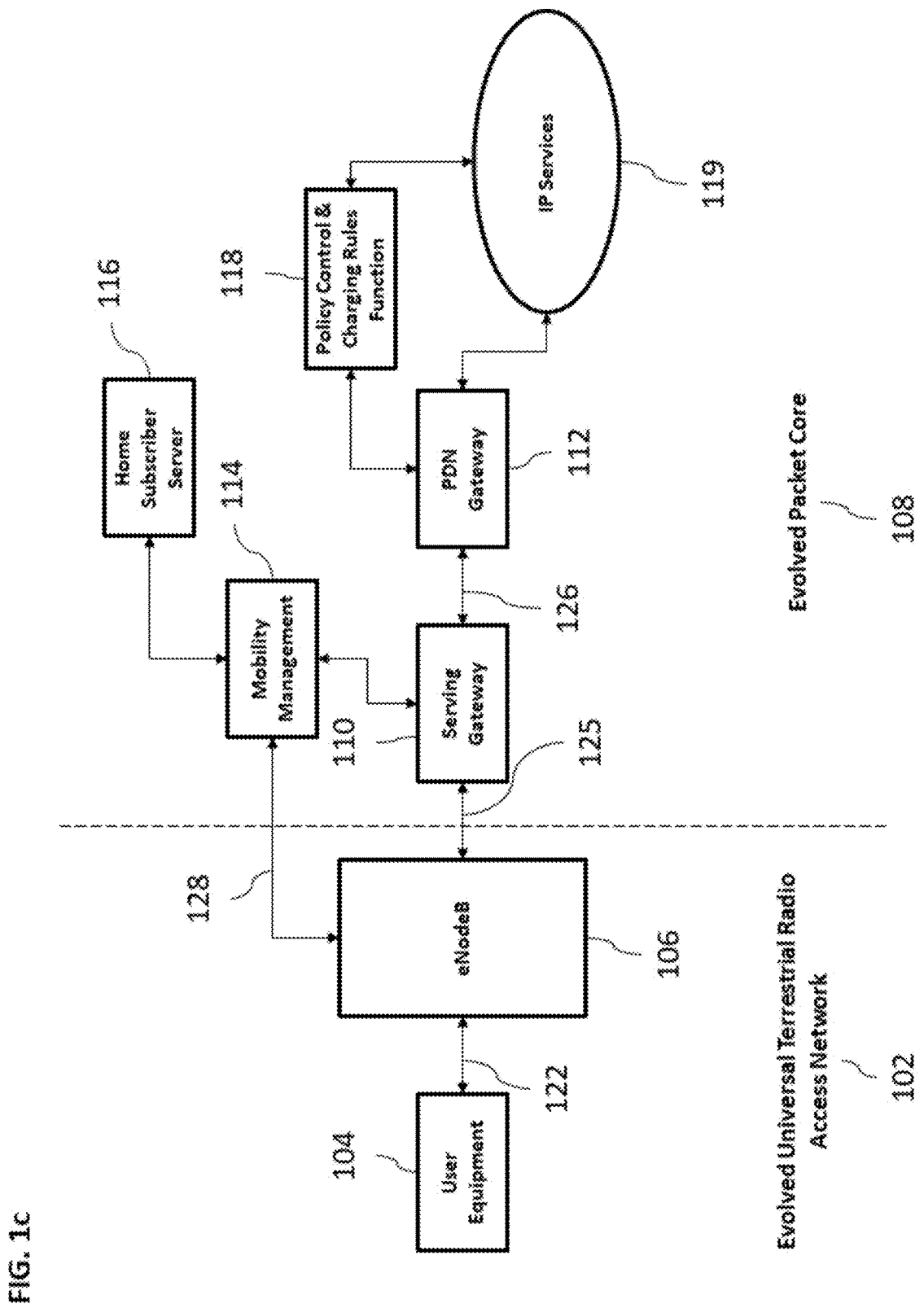

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
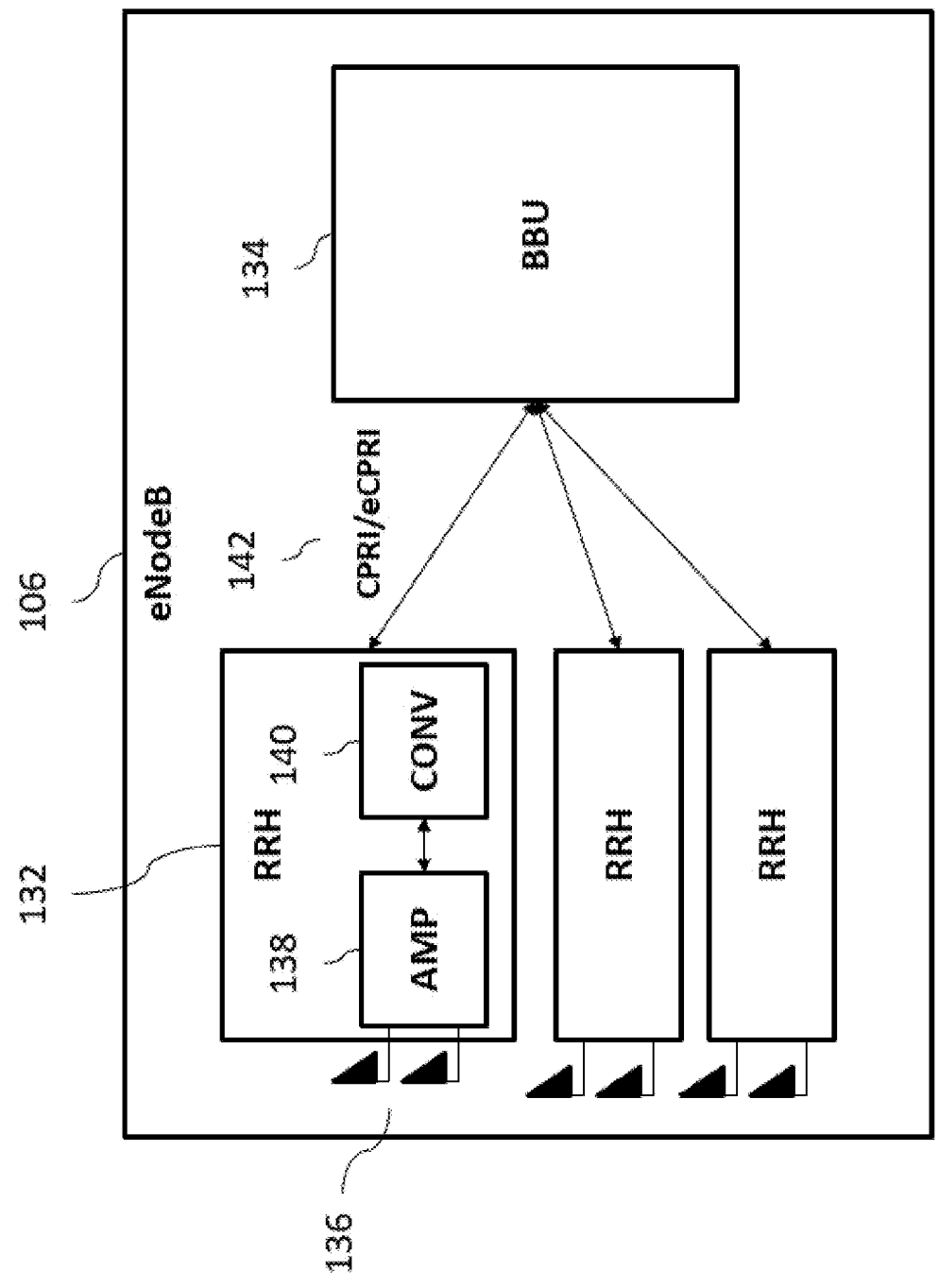

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
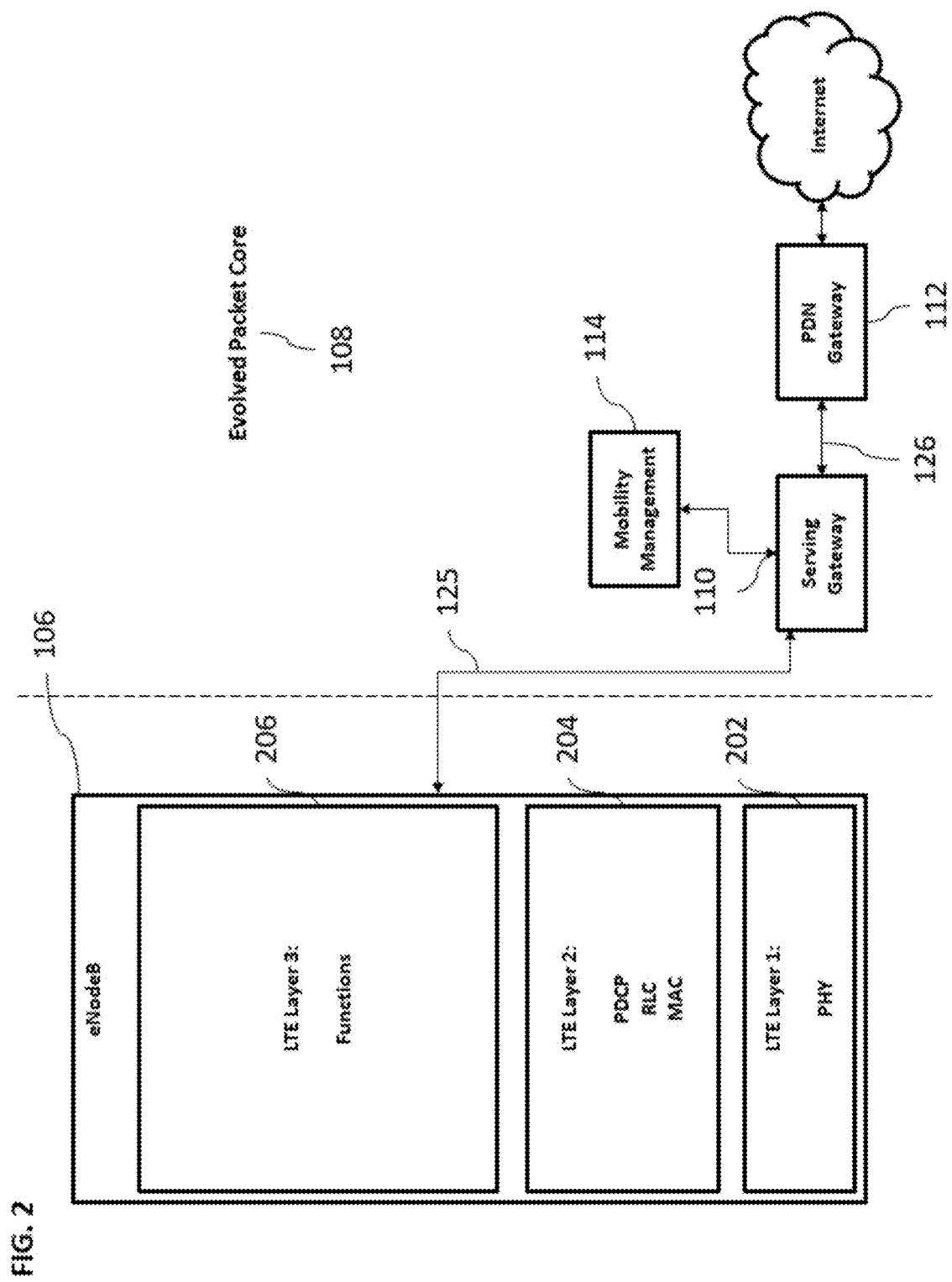
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
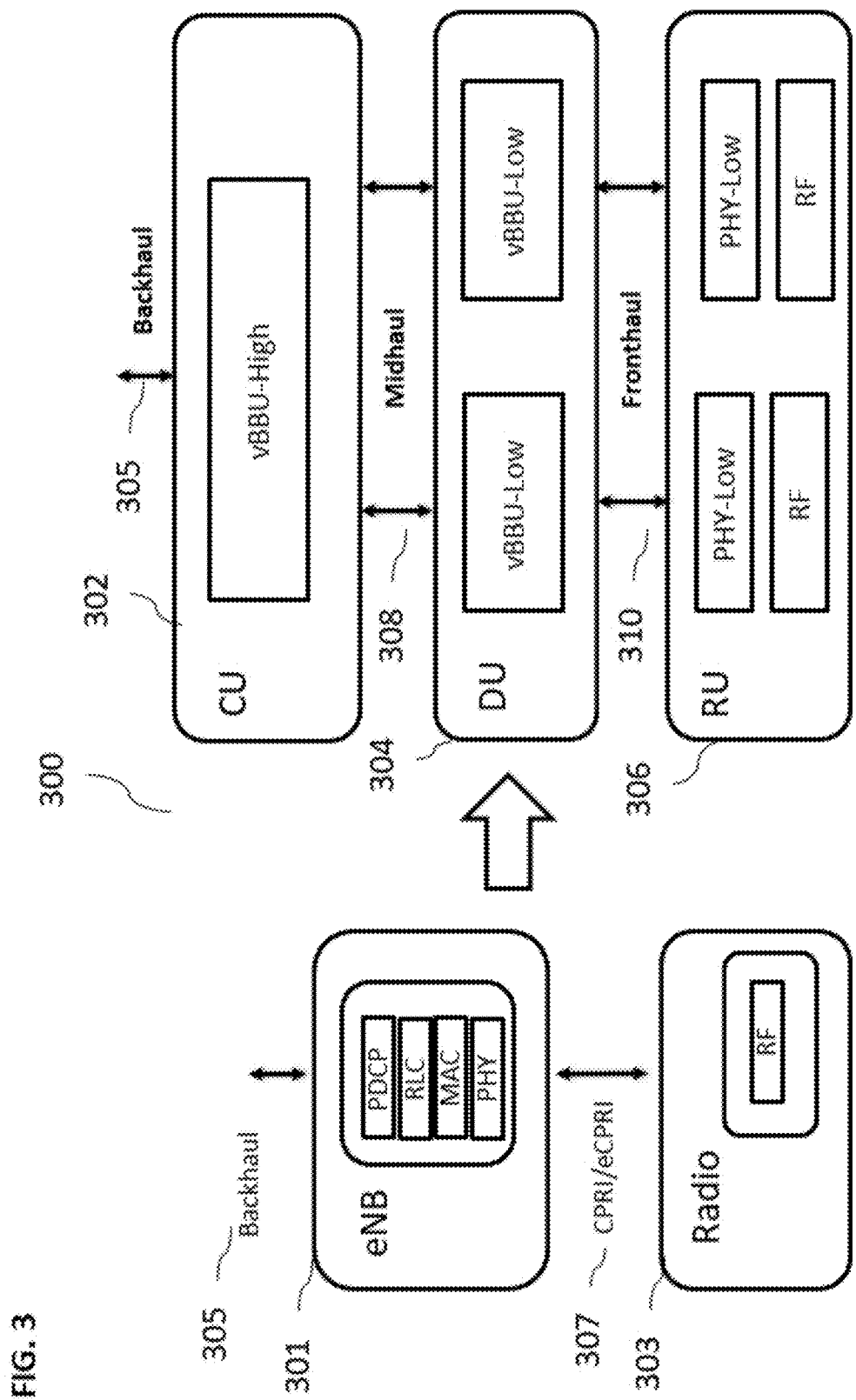
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 307, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split ("LLS") architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer split architecture (e.g., Option 7) can include a receiver in the uplink, joint processing across multiple transmission points (TPs) for both DL/UL, and transport bandwidth and latency requirements for ease of deployment. Further, the current subject matter's lower layer split architecture can include a split between cell-level and user-level processing, which can include cell-level processing in remote unit ("RU") and user-level processing in DU. Further, using the current subject matter's lower layer split architecture, frequency-domain samples can be transported via Ethernet fronthaul, where the frequency-domain samples can be compressed for reduced fronthaul bandwidth.

Figure 4:
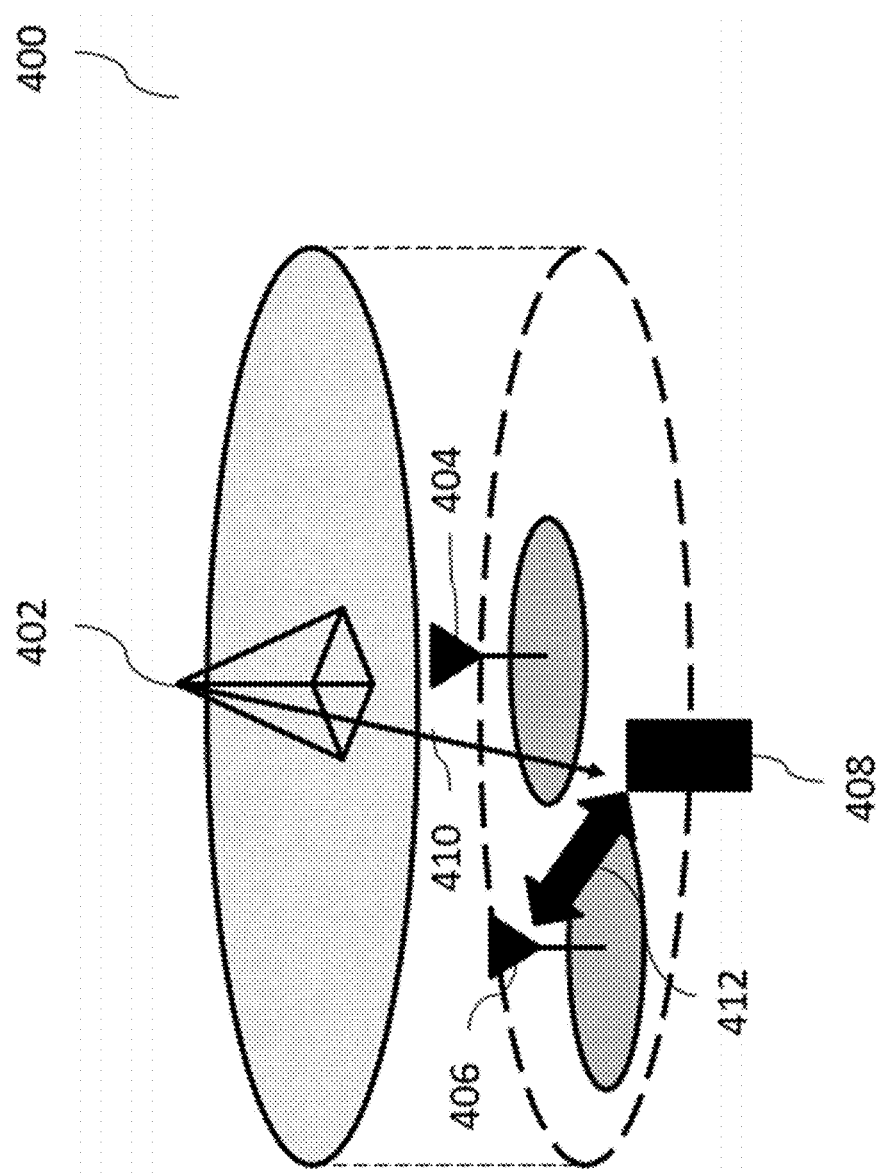
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the control plane and user plane are utilizing different frequency bands. In particular, the small cells 404, 406 can be configured to utilize higher frequency bands when communicating with the mobile device 408. The macro cell 402 can utilize existing cellular bands for control plane communications. The mobile device 408 can be communicatively coupled via user plane 412, where the small cell (e.g., small cell 406) can provide higher data rate and more flexible/cost/energy efficient operations. The macro cell 402, via control plane 410, can maintain good connectivity and mobility. Further, in some cases, LTE and NR can be transmitted on the same frequency.

Figure 5A:
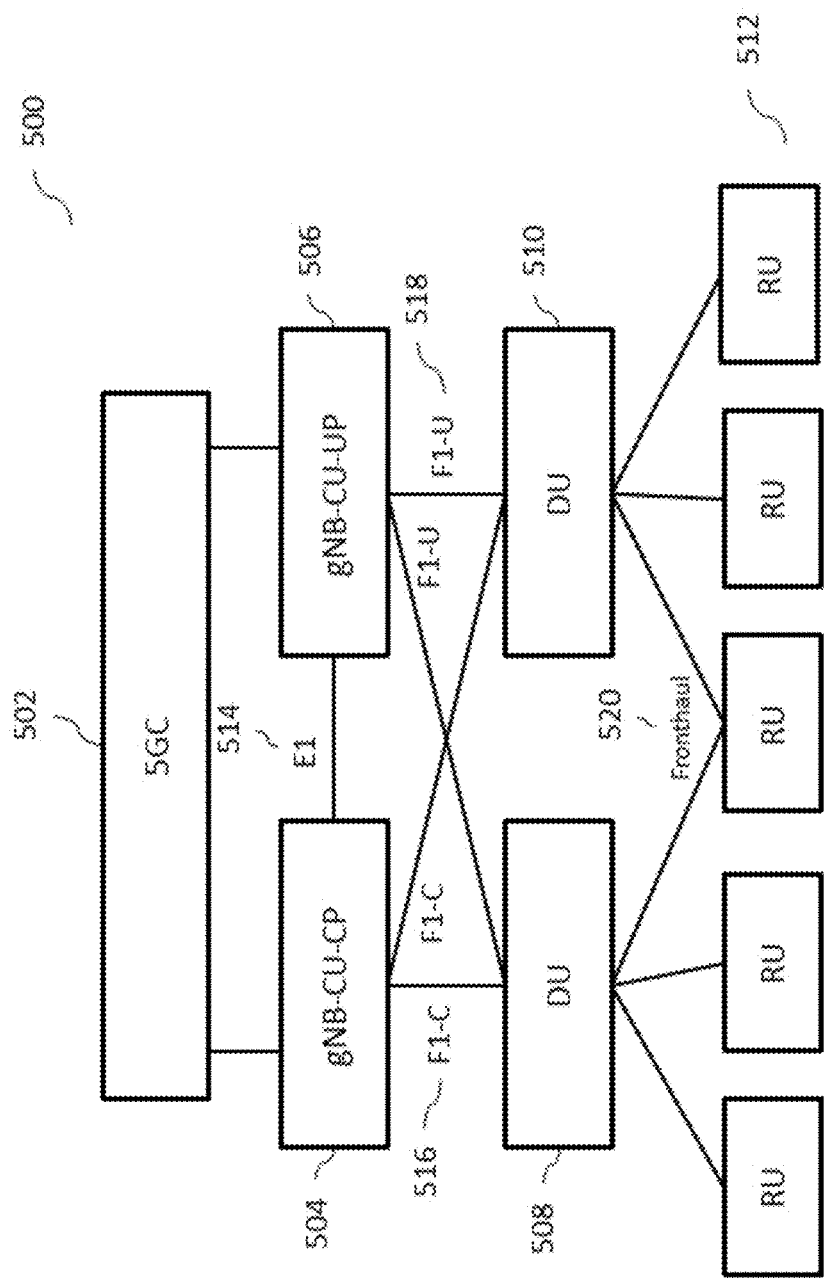
FIG. 5a illustrates an exemplary 5G wireless communication system.

FIG. 5*a* illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
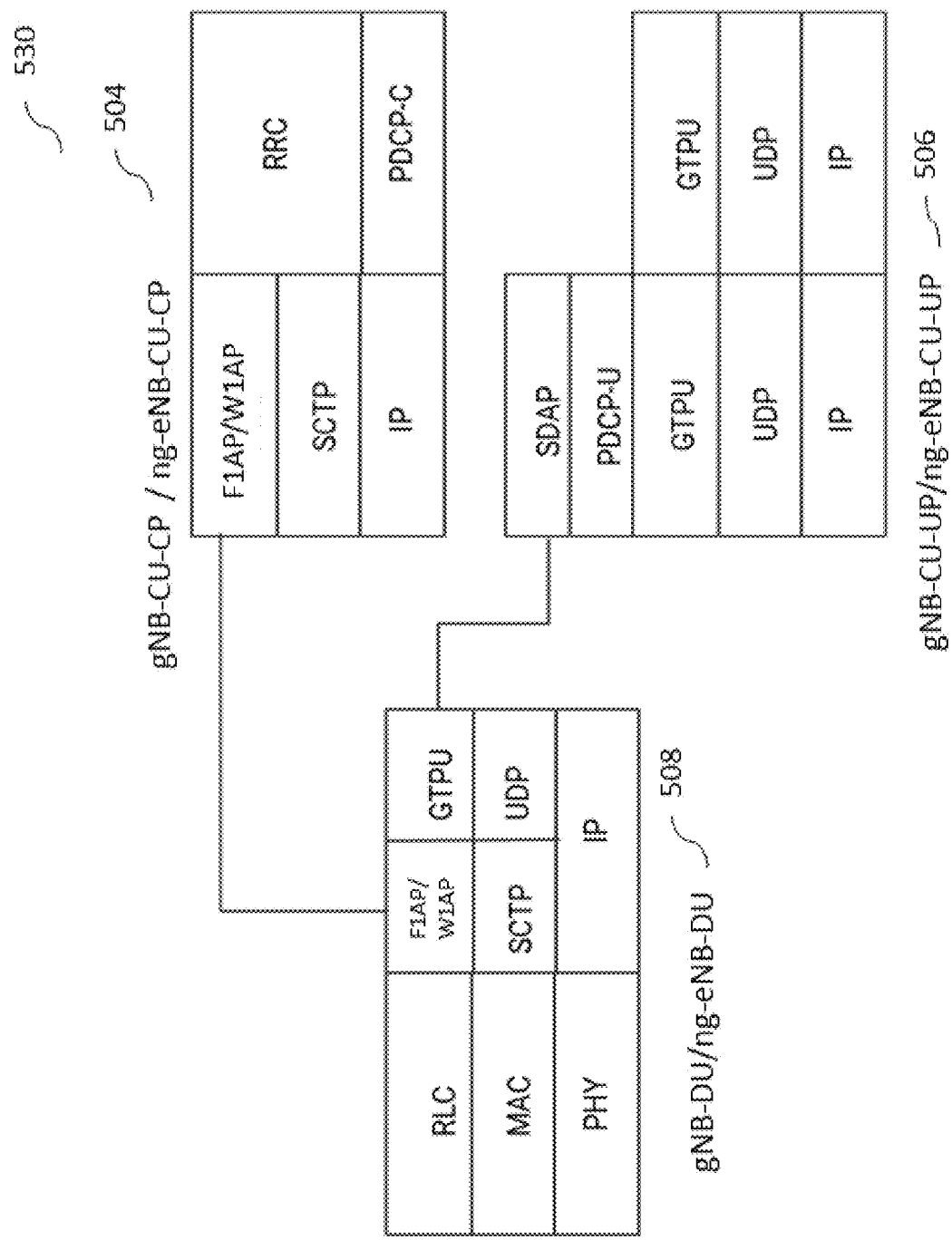
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
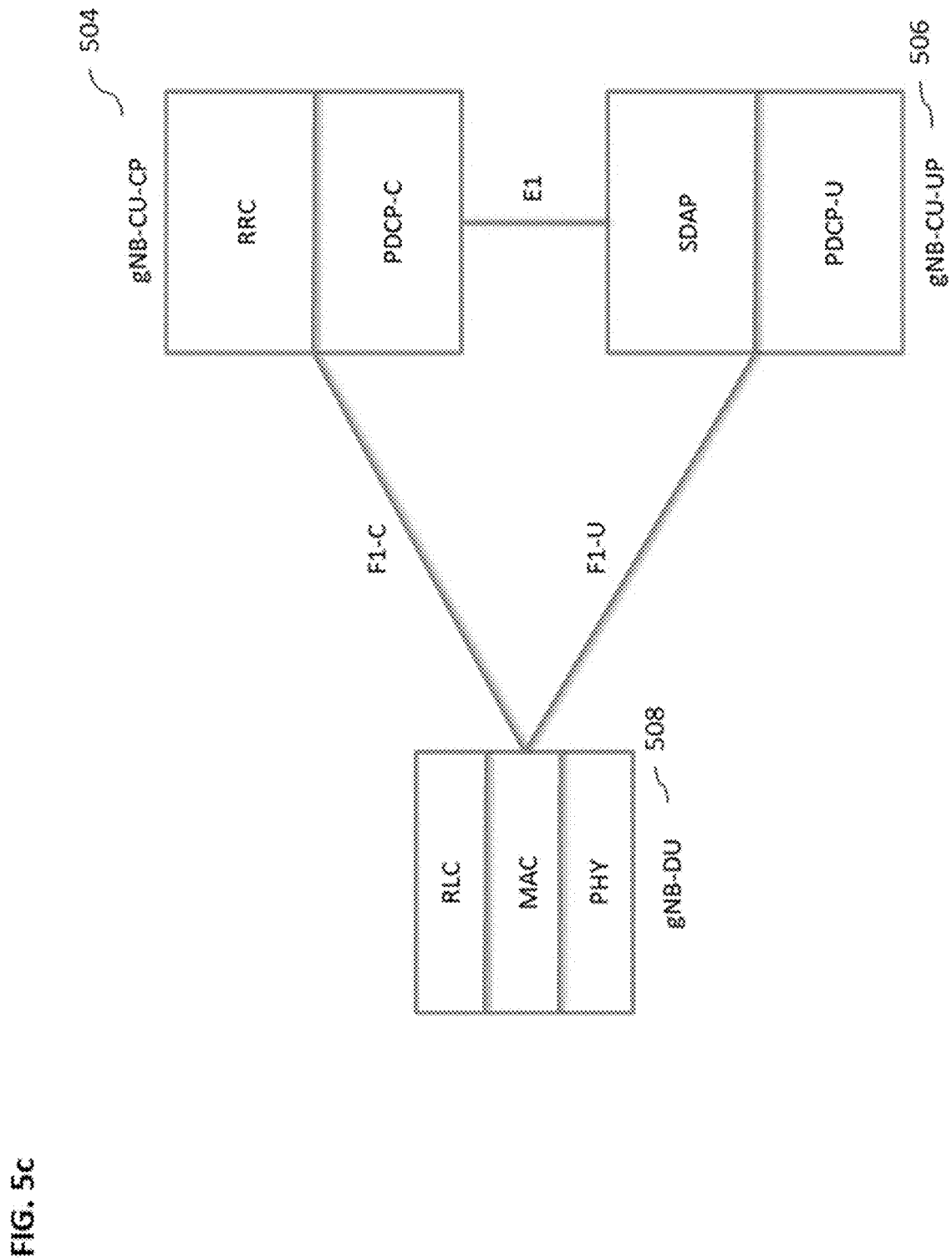
FIG. 5c illustrates an exemplary functional split in the gNB architecture shown in FIGS. 5a-5b.

FIG. 5c illustrates an exemplary functional split in the gNB architecture shown in FIGS. 5a-5b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Triggering Network Redundancy Based on Loopback Messaging

In some implementations of the current subject matter, a distributed unit (DU) can determine whether each of a plurality of radio units (RU) are properly communicating with the DU, and take remedial actions as discussed herein to trigger network redundancy in an O-RAN architecture. For example, the DU can monitor communications with RUs based on loopback messaging (LBM). Such remedial actions are not currently supported by O-RAN, requiring manual diagnosis and/or switching of DU MAC addresses, which can lead to extended delays in communications. In some implementations of the current subject matter, remedial actions can include suspension of communications with one or more RUs, establishing a new MAC address for communications with the RUs, and/or the like.

The O-RAN architecture can include a plurality of DUs each in communication with a plurality of RUs over a fronthaul (FH) connection between each DU and connected RU. Each DU can further be in communication with a centralized unit (CU).

Figure 6:
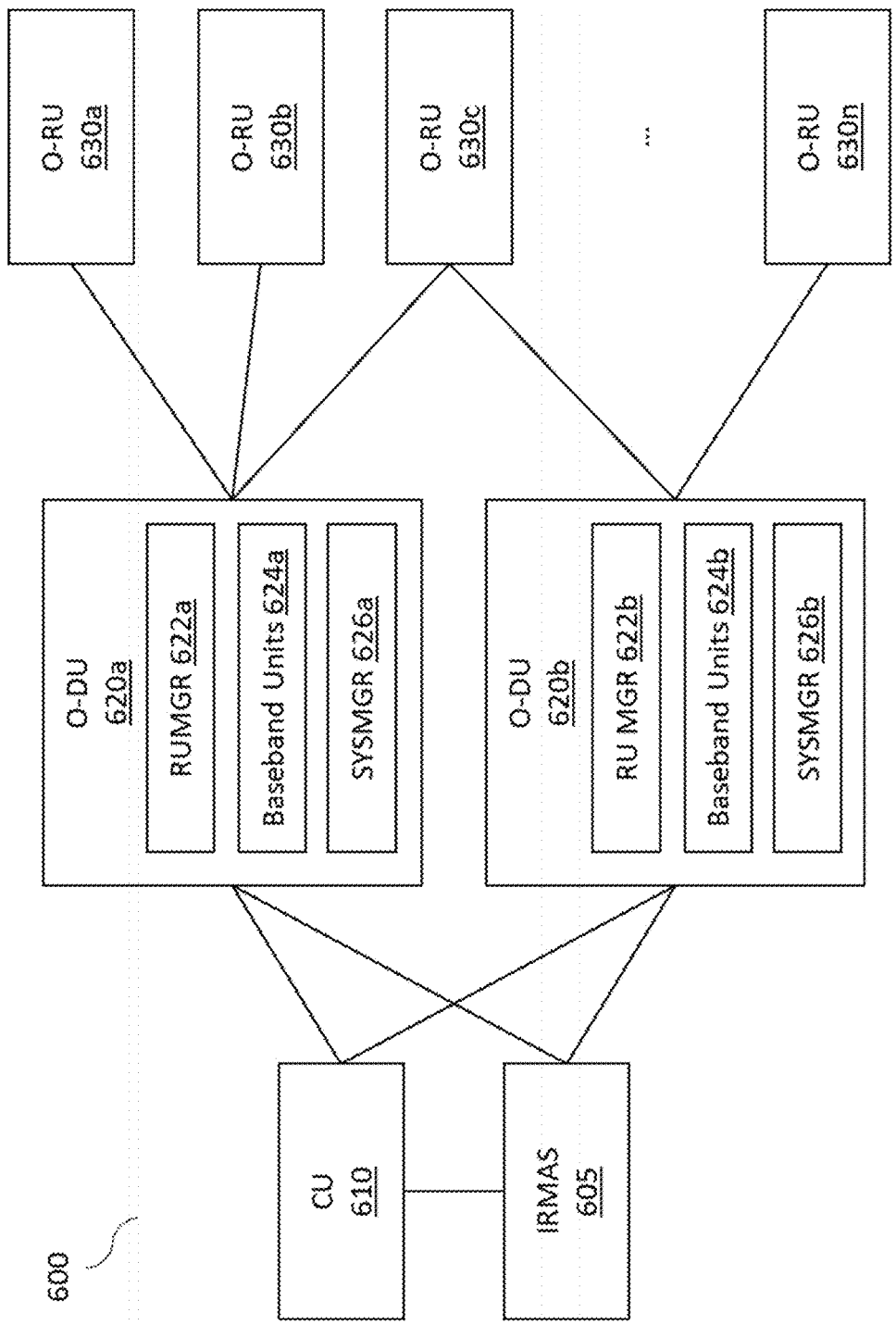
FIG. 6 illustrates an exemplary system that may be used in triggering network redundancy, according to some implementations of the current subject matter.

FIG. 6 illustrates an implementation of a system 600 that may be used in triggering network redundancy, according to some implementations of the current subject matter. The system 600 can be a radio access network operating in a wireless communication environment (e.g., 4G, LTE, 5G, etc.). The system 600 as shown in FIG. 6 is an O-RAN architecture and may include other components as discussed above and as will be appreciated by those skilled in the art.

The system 600 can include one or more distributed units DUs 620a, 620b, a CU 610, an IRMAS 605, and one or more RUs 630a, 630b, 630c, ... 620n. In FIG. 6, the suffix "n" denotes an integer variable equal to four or greater to indicate that any number of RUs 630 may be included in the system 600. Although not illustrated, any number of DUs 620 may similarly be included in the system 600. The DUs 620a, 620b in FIG. 6 are shown as "O-DU"'s to denote that the DUs in this illustrated implementation are O-RAN distributed units (e.g., the DUs are components in an O-RAN architecture), and the RUs 630a, 630b, 630c, ... 620n in FIG. 6 is shown as an "O-RU" to denote that the RUs in this illustrated implementation are O-RAN radio units (e.g., the RUs are components in an O-RAN architecture).

The DUs 620a, 620b can be configured to be communicatively coupled to any number of the RUs 630a, 630b, 630c, ... 620n, such as over a fronthaul communications link. Each fronthaul communications link can be similar to the fronthaul communications link between a DU and an RU as described herein (e.g., the fronthaul connection 310 between the DU 304 and the RU 306 of FIG. 3, a fronthaul connection on the fronthaul network 520 between the DU 508 and one of the RUs 512 of FIG. 5a, a fronthaul connection on the fronthaul network 520 between the DU 510 and one of the RUs 512 of FIG. 5a, etc.).

Messages that may be transmitted on a fronthaul communications link between a DU and an RU include messages transmitted in the control plane (C-plane), the user plane (U-plane), a synchronization plane (S-plane), and/or a management plane (M-plane). The control plane can include uplink and downlink messages (both DU to RU). The user plane can also include uplink (RU to DU) and downlink (DU to RU) messages, where IQ samples can be transmitted to/from user equipment. The uplink/downlink directions are not applicable to the transmission of messages in the synchronization and management planes. The synchronization plane can include messages carrying timing information. The management plane can include messages related to configuration (DU to RU) and notifications/measurements (RU to DU).

The DUs 620a, 620b can each include an RU manager (RUMGR) 622a, 622b, at least one baseband unit 624a, 624b (e.g., similar to baseband unit 134 of FIG. 1d), and/or a system manager (SYSMGR) 626a, 626b. Each of the RUMGR 622a, 622b, baseband unit(s) 624a, 624b, and SYSMGR 626a, 626b can be implemented via one or more processors executing programming instructions stored in at least one memory, one or more communication interfaces, and/or the like to implement their respective functionality, as described herein. In some implementations, each RUMGR 622a, 622b can be configured for management plane communications between the RUs 630a, 630b, 630c, ... 620n and the respective DU 620a, 620b. In some implementations, each baseband unit(s) 624a, 624b can be configured for control plane communications between the RUs 630a, 630b, 630c, ... 620n and the respective DU 620a, 620b. In some implementations, each SYSMGR 626a, 626b can be configured for maintaining carrier and/or baseband status information, such as information pertaining to connections between the RUs 630a, 630b, 630c, ... 620n, the DUs 620a, 620b, and/or the like.

The DUs 620a, 620b can be configured to be communicatively coupled to the CU 610 and/or the IRMAS 605. The CU 610 can be similar to the CUS described herein (e.g., the CU 302 of FIG. 3, the CU(s) of FIGS. 5a-5c, etc.). The IRMAS 605 can be configured to generate and/or maintain configuration information of base stations (e.g., gNodeBs), monitor alarms and/or statistics of the communication networks (e.g., 4G networks, 5G networks, etc.), and/or the like. In certain communication networks, such as 4G, communications between the IRMAS 605 and the RUs 630a, 630b, 630c, ... 620n can be indirect, such as through the CU 610. In other communication networks, such as 5G, communications between the IRMAS 605 and the RUs 630a, 630b, 630c, ... 620n can be direct. In some implementations, the IRMAS 605 can be or include a service management and orchestration (SMO) platform. In some implementations, the DUs 620a, 620b can be of the same mobile network operator (MNO). In other implementations, one or more of the DUs 620a, 620b can be of a different MNO than one or more of the other DUs 620a, 620b. Although not illustrated, any number of components (e.g., switches, routers, etc.) can be present and/or to enable communications between the various components of the system 600.

Figure 7A:
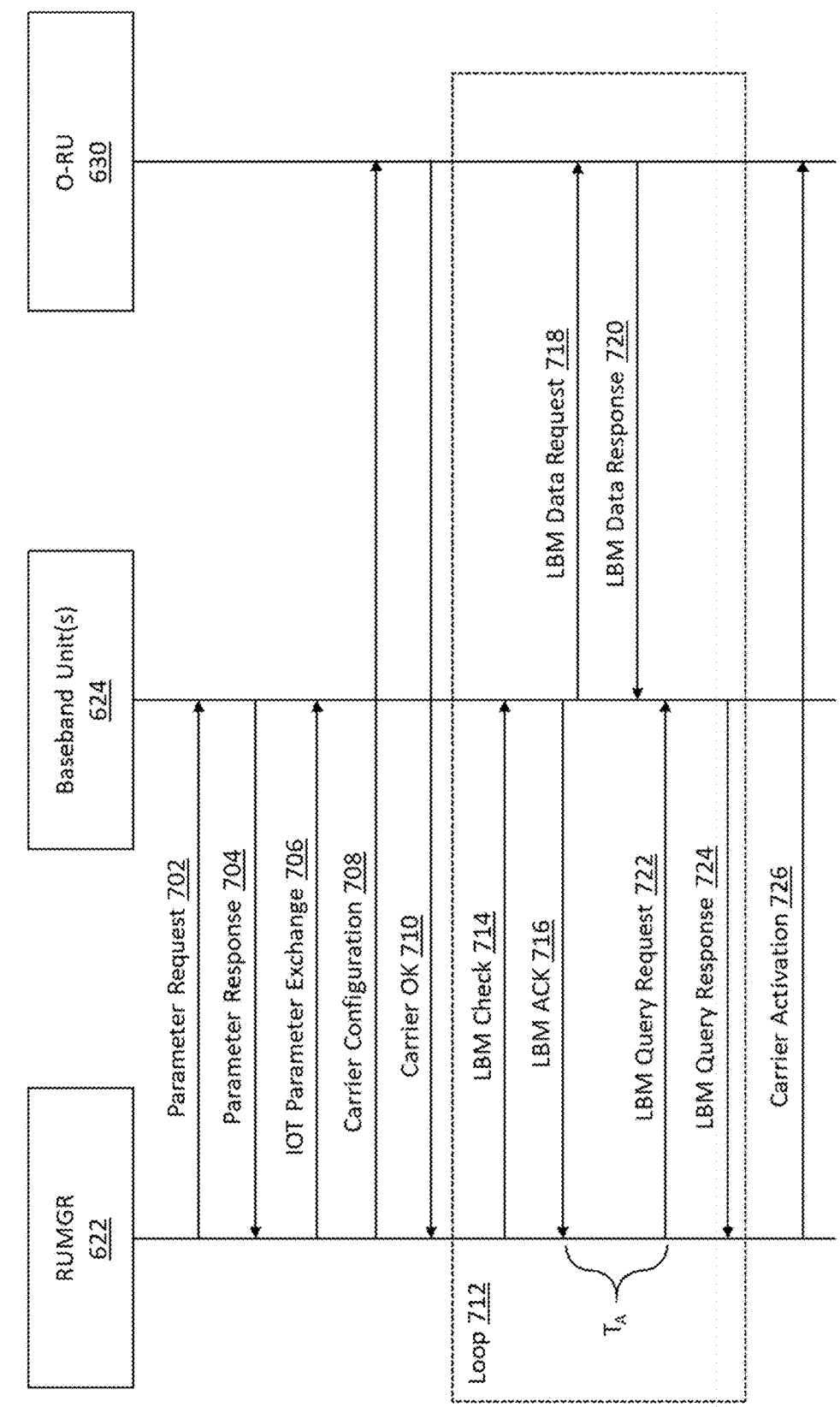
FIG. 7a illustrates a portion of an exemplary communication flow, according to some implementations of the current subject matter.
Figure 7B:
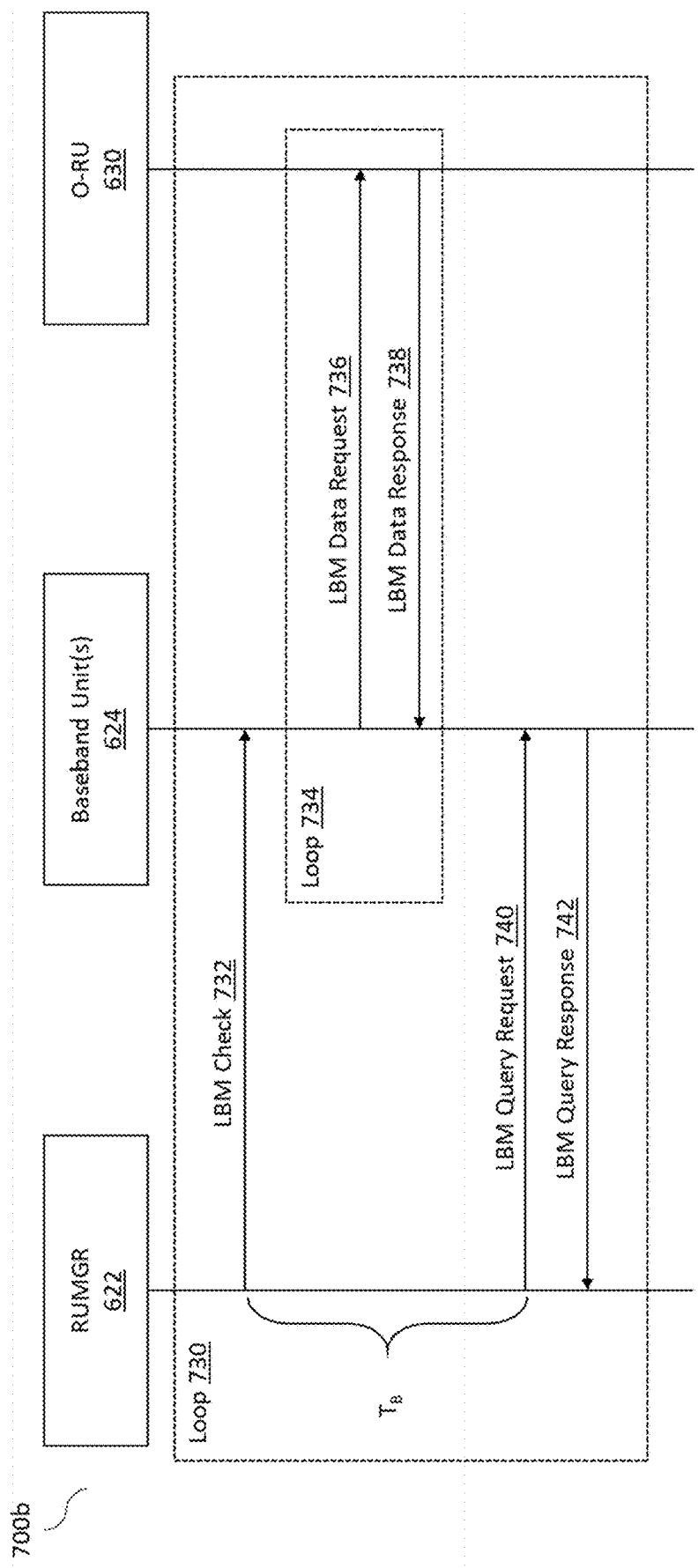
FIG. 7b illustrates a portion of an exemplary communication flow, according to some implementations of the current subject matter.
Figure 7C:
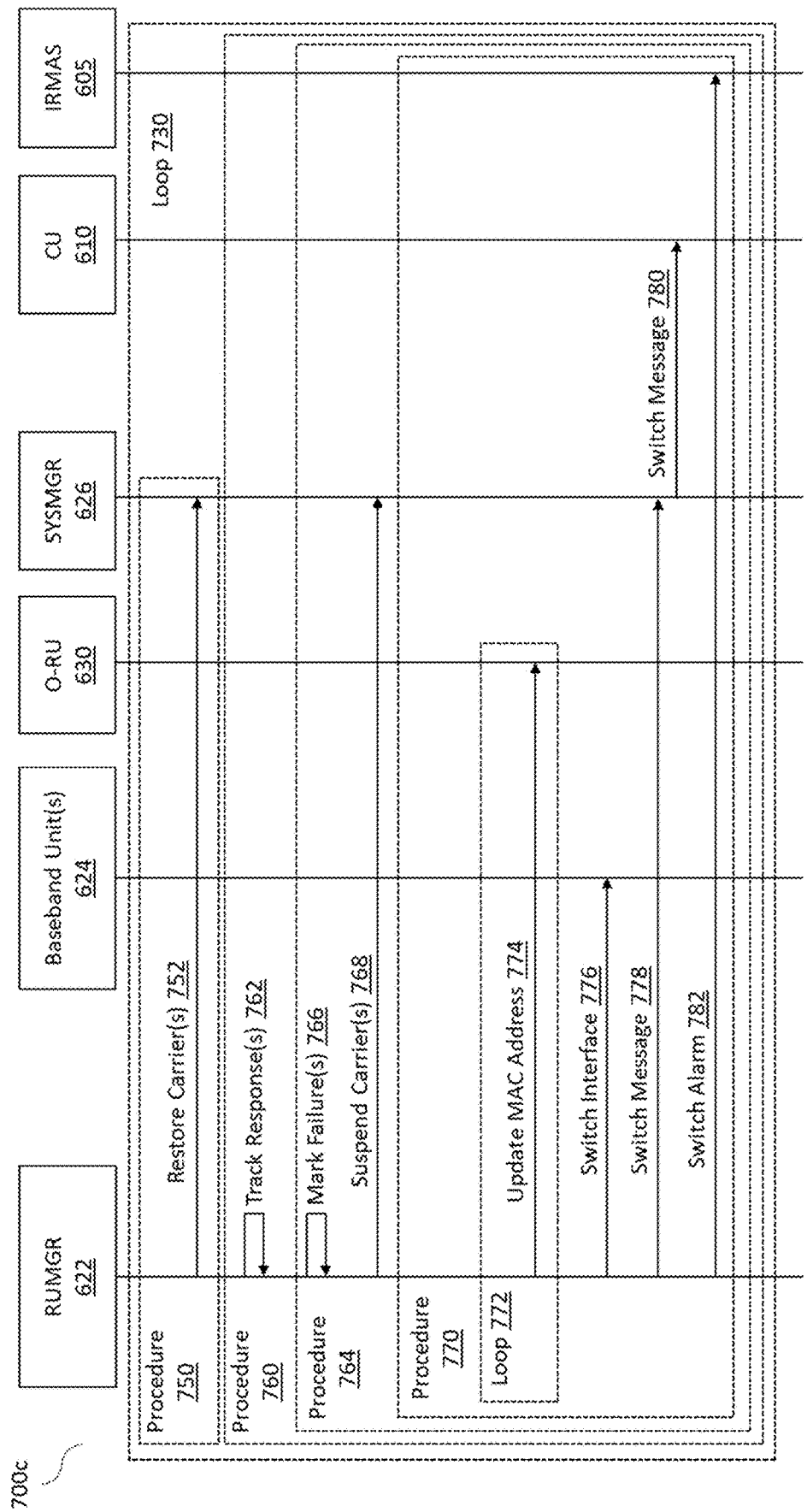
FIG. 7c illustrates a portion of an exemplary communication flow, according to some implementations of the current subject matter.

FIGS. 7a-7c illustrate various portions of an exemplary communication flow 700, according to some implementations of the current subject matter. In some implementations, the communication flow 700 can be implemented within system 600 of FIG. 6. The communication flow 700 is illustrated as three separate portions 700a, 700b, 700c, each of which, together or alone, can be regarded as a computer-implemented method. Only one RU 630 is shown in the implementation of FIGS. 7a-7c, but there can be a plurality of RUs 630 in communication with the DU 620, as described herein.

As part of the first portion 700a of the communication flow, the RUMGR 622 can transmit a parameter request 702 to baseband unit(s) 624. In response to the parameter request 702, the baseband unit(s) 624 can transmit a parameter response 704 to the RUMGR 622. The parameter response 704 can include one or more MAC addresses for the DU 620. One of the MAC addresses can be indicated as a default MAC address. Thereafter, the RUMGR 622 can transmit an IoT parameter exchange 706 to provide IoT parameters to baseband unit(s) 624. Thereafter, the RUMGR 622 can transmit carrier configuration 708 to the RU 630 to provide carrier information to the RU 630, such as the default MAC address for the DU 620. In response to the carrier configuration 708, the RU 630 can transmit a carrier configuration OK 710 to the RUMGR 622 to indicate whether the carrier configuration 708 was received and/or the configuration information is acceptable to the RU 630.

The first portion 700a of the communication flow can further include a loop 712, during which the DU 620 uses LBM messaging to determine whether to enable user plane communications with the RU 630. As part of the loop 712, the RUMGR 622 can transmit an LBM check 714 to baseband unit(s) 624, indicating that the baseband unit(s) 624 is requested to communicate with the RU 630. In response to the LBM check 714, the baseband unit(s) 624 can transmit a LBM acknowledgment 716 to the RUMGR 622, indicating receipt of the LBM check 714. Thereafter, the baseband unit(s) 624 can transmit LBM data request 718 to the RU 630 to request that the RU 630 respond. The LBM data request 718 can include the default MAC address of the DU 620 and/or a MAC address of the RU 630. In response to the LBM data request 718, the RU 630 can transmit a LBM data response 720 to the baseband unit(s) 624 to indicate whether the LBM data request 718 was received and/or indicate whether there is a communication issue at the RU 630.

Thereafter, the RUMGR 622 can transmit an LBM query request 722 to baseband unit(s) 624, indicating that the baseband unit(s) 624 is to provide information regarding the LBM data response 720. In some implementations, the LBM query request 722 is transmitted at time $T_A$ after receiving the LBM acknowledgment 716. In response to the LBM query request 722, the baseband unit(s) 624 can transmit a LBM query response 724 to the RUMGR 622, indicating whether the LBM data response 720 was received, whether the LBM data response 720 indicated there was an issue (e.g., OK or not OK indicators), whether the LBM data response 720 timed out, and/or the like.

If there was an issue or the LBM data response 720 timed out, the loop 712 can then repeat until the LBM query response 724 indicates the LBM data response 720 was received and there are no issues (e.g., OK indicator), or a predetermined number of loops have occurred with the LBM query response 724 indicating the LBM data response 720 was not received or there was an issue. If the LBM query response 724 indicates the LBM data response 720 was received and there are no issues (e.g., OK indicator), the RUMGR 622 can exit the loop 712 and transmit carrier activation 726 to the RU 630. The carrier activation 726 can establish one or more parameters for further communications between the DU 620 and the RU 630, such as LBM messaging. For example, the one or more parameters can include an indication of whether additional LBM messaging is to occur between the DU 620 and the RU 630, a periodicity of the additional LBM messaging, a number of consecutive times the additional LBM messaging will occur before the RU 630 is marked as non-responsive, and/or the like. The periodicity can include a predetermined amount of time between transmitting successive LBM checks and/or LBM data requests, which can be, for example, one second, two seconds, three seconds, four seconds, five seconds, and/or the like. The number of consecutive times the additional LBM messaging will occur before the RU 630 is marked as non-responsive can include a consecutive predetermined number of times, which can be, for example, one time, two times, three time, four times, five times, and/or the like. The carrier activation 726 can include a series of messages between the DU 620 and the RU 630 to enable further communications between the DU 620 and the RU 630.

In some aspects, the first portion 700a of the communication flow can be regarded as an initial enablement of the RU 630 (e.g., bring-up procedure) for activating a communications link between the RU 630 and the DU 620. At least a part of the first portion 700a of the communication flow can be repeated to enable other RUs 630 (e.g., RUs 630a, 630b, 630c, . . . 630n of FIG. 6) for activating communications links between the RUs 630 and the DU 620. The RUs 630 with an active communications link to the DU 620 can be regarded as being communicatively coupled with the DU 620.

At the end of the first portion 700a of the communication flow of FIG. 7a, the second portion 700b of the communication flow of FIG. 7b can continue. The second portion 700b of the communication flow can include a loop 730, during which the DU 620 uses LBM messaging to obtain the status of each RU 630 communicatively coupled to the DU 620. As part of the loop 730, the RUMGR 622 can transmit an LBM check 732 to baseband unit(s) 624, indicating that the baseband unit(s) 624 is requested to communicate with the RU 630. In response to the LBM check 732, the baseband unit(s) 624 can execute a loop 734, during which the status of the RU 630 is obtained from the RU 630.

As part of the loop 734 the baseband unit(s) 624 can transmit LBM data request 736 to the RU 630 to request that the RU 630 respond. The LBM data request 736 can include the default MAC address of the DU 620 and/or a MAC address of the RU 630. In response to the LBM data request 736, the RU 630 can transmit a LBM data response 738 to the baseband unit(s) 624 to indicate whether the LBM data request 736 was received and/or indicate whether there is a communication issue at the RU 630.

Thereafter, the RUMGR 622 can transmit an LBM query request 740 to baseband unit(s) 624, indicating that the baseband unit(s) 624 is to provide information regarding the LBM data response 720. In some implementations, the LBM query request 722 is transmitted at time $T_B$ after transmitting the LBM check 732. In some implementations, the time $T_B$ can be the same or different from time $T_A$, and alternatively the time $T_B$ can be established as part of the one or more parameters for further communications between the DU 620 and the RU 630 in the carrier activation 726. In response to the LBM query request 740, the baseband unit(s) 624 can transmit a LBM query response 742 to the RUMGR 622, indicating whether the LBM data response 738 was received, whether the LBM data response 738 indicated there was an issue (e.g., OK or not OK indicators), whether the LBM data response 738 timed out, and/or the like.

If the LBM query response 742 indicates the LBM data response 738 was received and there are no issues (e.g., OK indicator), and the individual RU 630 that transmitted the LBM data response 738 is not currently suspended, then the loop 730 can repeat until the LBM query response 742 indicates the LBM data response 738 was not received or there are issues (e.g., not OK indicator). For example, the loop 730 can repeat based on the established periodicity, such that the LBM check 732 and/or the LBM data request 736 are transmitted a predetermined amount of time after the respective prior LBM check 732 or LBM data request 736. In some aspects, the second portion 700b of the communication flow can be regarded as a periodic LBM messaging stage between the RU 630 and the DU 620.

Alternatively, if the LBM query response 742 indicates the LBM data response 738 was received and there are no issues (e.g., OK indicator), and the individual RU 630 that transmitted the LBM data response 738 is currently suspended, then the loop 730 can execute procedure 750, as illustrated in the third portion 700c of the communication flow of FIG. 7c. As part of the procedure 750, the communications link between the DU 620 and the individual RU 630 that is currently suspended can be restored. For example, as part of procedure 750 the RUMGR 622 can transmit information to restore carriers 752 to the SYSMGR 626 to indicate that the communications link between the DU 620 and the individual RU 630 is restored. Thereafter, the loop 730 can repeat until the LBM query response 742 indicates the LBM data response 738 was not received or there are issues (e.g., not OK indicator).

Alternatively, if the LBM query response 742 indicates the LBM data response 738 was not received or there are issues (e.g., not OK indicator), then the loop 730 can execute procedure 760, as illustrated in the third portion 700c of the communication flow of FIG. 7c. As part of the procedure 760, the RUMGR 622 can track responses 762 of each RU 630 based on the LBM query response 742, such as by incrementing a counter on a per-RU 630 basis that tracks the number of consecutive LBM query responses 742 indicating the LBM data response 738 was not received or there are issues. If the number of consecutive LBM query responses 742, indicating the LBM data response 738 was not received from an individual RU 630 or there are issues with the individual RU 630, does not exceeds a predetermined threshold (e.g., established consecutive predetermined number of times) then the loop 730 can repeat until the LBM query response 742 indicates the LBM data response 738 was not received or there are issues (e.g., not OK indicator).

If the number of consecutive LBM query responses 742, indicating the LBM data response 738 was not received from an individual RU 630 or there are issues with the individual RU 630, does exceeds a predetermined threshold then procedure 760 can execute procedure 764. As part of procedure 764, the RUMGR can mark failure 766 of the individual RU 630 and suspend a communications link with the RU 630. For example, as part of suspending the communications link the RUMGR can transmit information to suspend carrier(s) 768 to the SYSMGR 626.

As part of procedure 764, if at least one RU 626 in communication with the DU 620 is not suspended, then the loop 730 can repeat until the LBM query response 742 indicates the LBM data response 738 was not received or there are issues (e.g., not OK indicator). However, if all of the RUs 626 are currently suspended, then procedure 770 can be executed. As part of procedure 770, loop 772 can be executed during which an updated MAC address 774 is communicated with each of the plurality of RUs 630 that are currently suspended. In some implementations, the updated MAC address can be requested by the RUMGR 622 from the baseband unit(s) 624 (e.g., similar to the parameter request 702 and parameter response 704), or the updated MAC address 774 can be one that was previously provided to the RUMGR 622 as part of a prior parameter response 704. After the update MAC address 774 has been transmitted to each of the plurality of RUs 630, the DU 620 can resume communications with the plurality of RUs 630 based on the updated MAC address 774. As part of the process of switching to the updated MAC address, the RUMGR 622 can additionally transmit switch interface 776 to the baseband unit(s) 624, transmit switch message 778 to the SYSMGR 626 (which in turn can transmit switch message 780 to the CU 610), and/or transmit switch alarm 782 to the IRMAS 605, which can be used to inform each of the baseband unit(s) 624, SYSMGR 626, CU 610, and/or IRMAS 605 of the updated MAC address for additional communications with the DU 620.

After communications have been reestablished with the RUs 630 based on the updated MAC address and the completion of procedure 770, the loop 730 can repeat until the LBM query response 742 indicates the LBM data response 738 was not received or there are issues (e.g., not OK indicator). In some aspects, the third portion 700c of the communication flow can be regarded as an LBM message processing and network redundancy triggering stage between the DU 620 another other entities in an O-RAN architecture. Although not explicitly labeled or described as such in every instance, any of the information transmitted among the entities of the O-RAN architecture among the various portions 700a, 700b, 700c of the communication flow of FIGS. 7a-7c can be regarded as communications or messages, such as messages having structured or unstructured data.

The NETCONF/YANG protocol (or application layer mode of communication) can be used for operations and/or management of network functions. The NETCONF/YANG is a network management protocol developed and standardized by the Internet Engineering Task Force (IETF) under RFC 4741 and RFC 6241 standards. The NETCONF/YANG protocol provides mechanisms to install, manipulate, and delete configuration of network devices. As mentioned above, LLS architecture can include lower layer split architecture can include a split between cell-level and user-level processing, which can include cell-level processing in the RU and user-level processing in the DU. In an O-RAN architecture, the LLS control plane (LLS-C) logical interface between the RU and the DU can be used for control plane communications between the RU and the DU. The O-RAN Working Group 4 (Open Fronthaul Interfaces WG), "Control, User and Synchronization Plane Specification" specifies the control plane, user plane, and synchronization plane protocols used over a fronthaul connection for a DU (O-DU) and an RU (O-RU) with a lower layer split (LLS) architecture.

Figure 8:
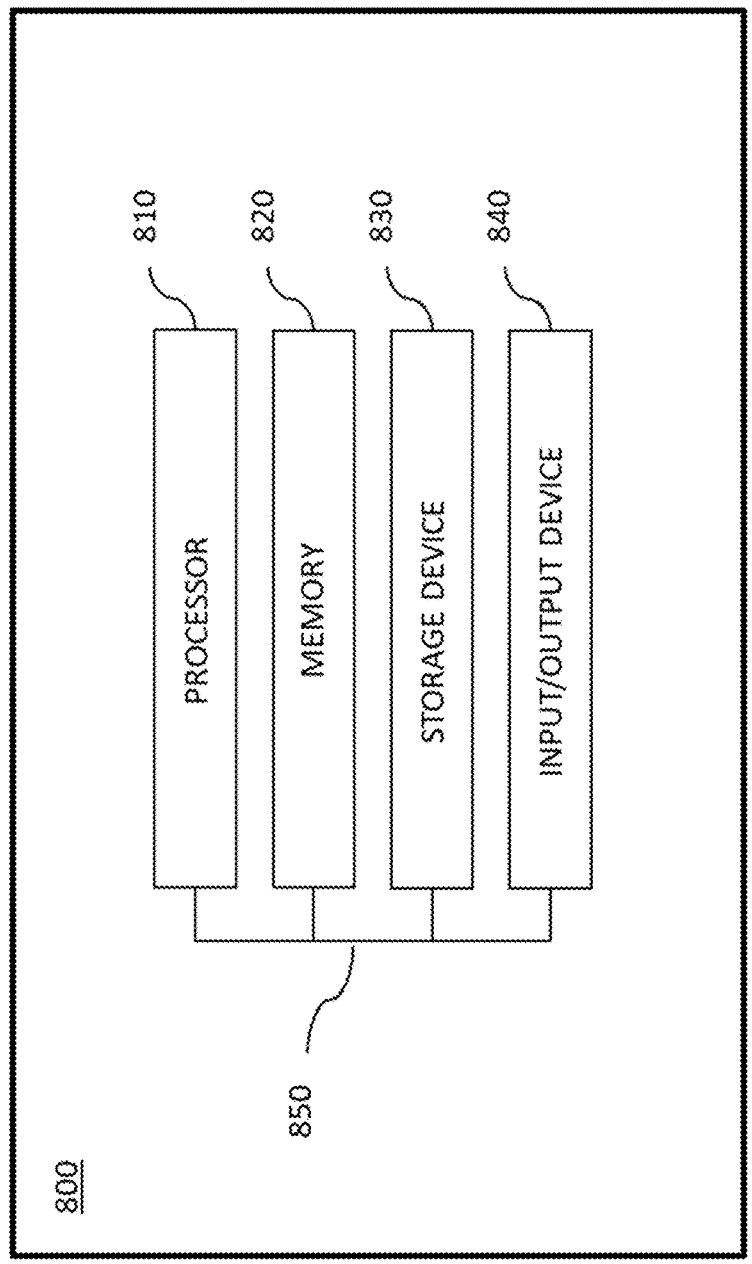
FIG. 8 illustrates an exemplary system, according to some implementations of the current subject matter.

In some implementations, the current subject matter can be configured to be implemented in a system 800, as shown in FIG. 8. The system 800 can include one or more of a processor 810, a memory 820, a storage device 830, and an input/output device 840. Each of the components 810, 820, 830 and 840 can be interconnected using a system bus 850. The processor 810 can be configured to process instructions for execution within the system 600. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

Figure 9:
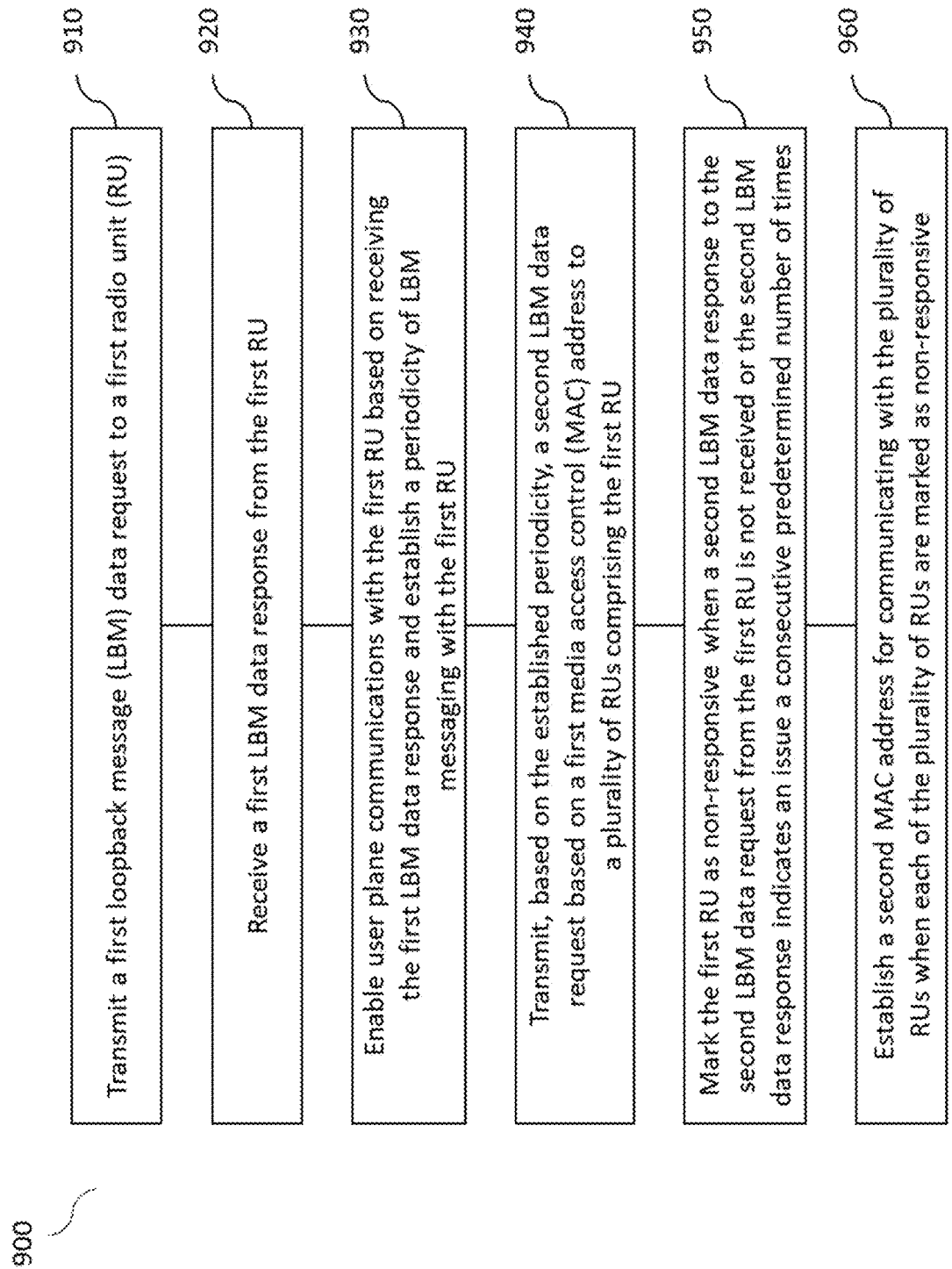
FIG. 9 illustrates an exemplary method of triggering network redundancy, according to some implementations of the current subject matter.

FIG. 9 illustrates an exemplary method 900 for triggering network redundancy, according to some implementations of the current subject matter. The method 900 may be performed, for example, using implementations shown in and described with respect to FIGS. 6-8.

The method 900 can be performed. The method 900 includes transmitting 910, via a DU (e.g., DU 304 of FIG. 3, DUs 508, 510 of FIGS. 5a-5c, DUs 620a, 620b of FIG. 6, etc.), a first LBM data request to a first radio unit RU (e.g., RU 306 of FIG. 3, RU 512 of FIG. 5a, RUs 630a, 630b, 630c, . . . 630n of FIG. 6, etc.). For example, the first LBM data request can be similar to the LBM data request 736 of FIG. 7a.

The method 900 further includes receiving 920, via the DU, a first LBM data response from the first RU. For example, the first LBM data response can be similar to the LBM data response 738 of FIG. 7a.

The method 900 further includes enabling 930, via the DU, user plane communications with the first RU based on receiving the first LBM data response and establishing a periodicity of LBM messaging with the first RU. For example, the enabling and/or establishing can be similar to the carrier activation 726 of FIG. 7a. It will be appreciated that steps 910-930 can be part of an initial enablement of the first RU (e.g., bring-up procedure) for activating communications between the first RU and the DU. Other steps and/or methods can be performed for activating communications between the first RU and the DU, and accordingly, steps 910-930 are optional.

The method 900 further includes transmitting 940, via the DU and based on the established periodicity, a second LBM data request based on a first media access control (MAC) address to a plurality of RUs comprising the first RU. For example, the second LBM data request can be similar to the LBM data request 736 of FIG. 7*b* (e.g., as part of loop 734 for each of the plurality of RUs).

The method 900 further includes marking 950, via the DU, the first RU as non-responsive when a second LBM data response to the second LBM data request from the first RU is not received or the second LBM data response indicates an issue a consecutive predetermined number of times. For example, the second LBM data response can be similar to the LBM data response 738 of FIG. 7*b* (e.g., as part of loop 734 for each of the plurality of RUs). The marking can be similar to the mark failure step 766 of FIG. 7*c*.

The method 900 further includes establishing 960, via the DU, a second MAC address for communicating with the plurality of RUs when each of the plurality of RUs are marked as non-responsive. For example, the enabling can be similar to the update MAC address step 774 of FIG. 7*c* (e.g., as part of loop 772 for each of the plurality of RUs).

In some implementations, the current subject matter can include one or more of the following optional features.

In some implementations, enabling the user plane communications can include establishing the predetermined number of times with the first RU.

In some implementations, the DU can include at least one baseband unit configured for control plane communications and the user plane communications with the plurality of RUs over a fronthaul (FH) interface within an Open Radio Access Network (O-RAN) architecture. In related implementations, the first LBM data request is transmitted to the first RU via the at least one baseband unit, the first LBM data response is received from the first RU via the at least one baseband unit, and/or the second LBM data request is transmitted to the plurality of RUs via the at least one baseband unit.

In some implementations, the DU can include an RU manager unit configured for management plane communications with the plurality of RUs over the FH interface. In related implementations, the user plane communications with the first RU are enabled via the RU manager unit, the first RU is marked as non-responsive via the RU manager unit, and the second MAC address is established for communicating with the plurality of RUs via the RU manager unit.

In some implementations, the method can further include transmitting a parameter request to the at least one baseband unit via the RU manager unit, receiving a parameter response responsive to the parameter request from the at least one baseband unit via the RU manager unit, transmitting a carrier configuration to the first RU via the RU manager unit based on a third MAC address, and/or receiving a carrier configuration confirmation from the first RU via the RU manager unit. In related implementations the parameter response includes the first MAC address of the DU and the third MAC address of the first RU and/or the first LBM data request is transmitted after receiving the carrier configuration confirmation.

In some implementations, the method can further include transmitting a first LBM check to the at least one baseband unit via the RU manager unit, receiving an acknowledgment responsive to the first LBM check from the at least one baseband unit via the RU manager unit, transmitting a first LBM query request to the first RU via the RU manager unit a first predetermined time after receiving the first acknowledgment, and/or receiving a first LBM query response responsive to the first LBM query request from the first RU via the RU manager unit. In related implementations the first LBM data request is transmitted to the first RU based on the first LBM check, the first LBM query response indicates whether the first LBM data response was received from the first RU, and/or enabling the user plane communications with the first RU is based on receiving the first LBM query response.

In some implementations, the method can further include transmitting a second LBM check to the at least one baseband unit via the RU manager unit, transmitting a second LBM query request to the first RU via the RU manager unit a second predetermined time after transmitting the second LBM check, and/or receiving a second LBM query response responsive to the second LBM query request from the first RU via the RU manager unit. In related implementations, the second LBM data request is transmitted to the first RU based on the second LBM check, enabling the user plane communications includes establishing the second predetermined time with the first RU, and/or the second LBM query response indicates whether the second LBM data response was received from the first RU.

In some implementations, the method can further include transmitting a suspension message to a system manager unit via the DU to suspend communications with the first RU when the first RU is marked as non-responsive, transmitting a restore message to a system manager unit via the DU to restore communications with the first RU when the second LBM data response is received and indicates a status of communications with the first RU is okay, and/or transmitting an interface switch message to the system manager unit via the DU to indicate communications with the plurality of RUs has switched to the second MAC address when each of the plurality of RUs are marked as non-responsive.

The use of "when" is not intended to require instantaneous or immediate action, such as instantaneous or immediate transmission of data. Instead, it is intended that "when" be interpreted in a broad sense, including actions that occur, based on a specified condition being met, later in time.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method, comprising:
    transmitting, via a distributed unit (DU), a first loopback message (LBM) data request to a first radio unit (RU);
    receiving, via the DU, a first LBM data response from the first RU;
    enabling, via the DU, user plane communications with the first RU based on receiving the first LBM data response, wherein enabling the user plane communications comprises establishing a periodicity of LBM messaging with the first RU;
    transmitting, via the DU and based on the established periodicity, a second LBM data request based on a first media access control (MAC) address to a plurality of RUs comprising the first RU;
    marking, via the DU, the first RU as non-responsive when a second LBM data response to the second LBM data request from the first RU is not received or the second LBM data response indicates an issue a consecutive predetermined number of times; and
    establishing, via the DU, a second MAC address for communicating with the plurality of RUs when each of the plurality of RUs are marked as non-responsive, wherein the second MAC address is different from the first MAC address.

2. The computer-implemented method of claim 1, wherein enabling the user plane communications comprises establishing the predetermined number of times with the first RU.

3. The computer-implemented method of claim 1, wherein the DU comprises at least one baseband unit configured for control plane communications and the user plane communications with the plurality of RUs over a fronthaul (FH) interface within an Open Radio Access Network (O-RAN) architecture, wherein the first LBM data request is transmitted to the first RU via the at least one baseband unit, wherein the first LBM data response is received from the first RU via the at least one baseband unit, and wherein the second LBM data request is transmitted to the plurality of RUs via the at least one baseband unit.

4. The computer-implemented method of claim 3, wherein the DU further comprises an RU manager unit configured for management plane communications with the plurality of RUs over the FH interface, wherein the user plane communications with the first RU are enabled via the RU manager unit, wherein the first RU is marked as non-responsive via the RU manager unit, and wherein the second MAC address is established for communicating with the plurality of RUs via the RU manager unit.

5. The computer-implemented method of claim 4, further comprising:
transmitting, via the RU manager unit, a parameter request to the at least one baseband unit;
receiving, via the RU manager unit, a parameter response responsive to the parameter request from the at least one baseband unit, wherein the parameter response comprises the first MAC address of the DU and a third MAC address of the first RU;
transmitting, via the RU manager unit, a carrier configuration to the first RU based on the third MAC address; and
receiving, via the RU manager unit, a carrier configuration confirmation from the first RU, wherein the first LBM data request is transmitted after receiving the carrier configuration confirmation.

6. The computer-implemented method of claim 4, further comprising:
transmitting, via the RU manager unit, a first LBM check to the at least one baseband unit, wherein the first LBM data request is transmitted to the first RU based on the first LBM check;
receiving, via the RU manager unit, an acknowledgment responsive to the first LBM check from the at least one baseband unit;
transmitting, via the RU manager unit, a first LBM query request to the first RU a first predetermined time after receiving the first acknowledgment; and
receiving, via the RU manager unit, a first LBM query response responsive to the first LBM query request from the first RU, wherein the first LBM query response indicates whether the first LBM data response was received from the first RU, and wherein enabling the user plane communications with the first RU is based on receiving the first LBM query response.

7. The computer-implemented method of claim 4, further comprising:
transmitting, via the RU manager unit, a second LBM check to the at least one baseband unit, wherein the second LBM data request is transmitted to the first RU based on the second LBM check;
transmitting, via the RU manager unit, a second LBM query request to the first RU a second predetermined time after transmitting the second LBM check, wherein enabling the user plane communications comprises establishing the second predetermined time with the first RU; and receiving, via the RU manager unit, a second LBM query response responsive to the second LBM query request from the first RU, wherein the second LBM query response indicates whether the second LBM data response was received from the first RU.

8. The computer-implemented method of claim 1, further comprising:
transmitting, via the DU, a suspension message to a system manager unit to suspend communications with the first RU when the first RU is marked as non-responsive;
transmitting, via the DU, a restore message to a system manager unit to restore communications with the first RU when the second LBM data response is received and indicates a status of communications with the first RU is okay; and
transmitting, via the DU, an interface switch message to the system manager unit to indicate communications with the plurality of RUs has switched to the second MAC address when each of the plurality of RUs are marked as non-responsive.

9. An apparatus, comprising:
at least one processor, and
at least one non-transitory storage media storing instructions that, when executed by the at least one processor, cause the at least one processor to perform operations comprising:
transmitting, via a distributed unit (DU), a first loopback message (LBM) data request to a first radio unit (RU);
receiving, via the DU, a first LBM data response from the first RU;
enabling, via the DU, user plane communications with the first RU based on receiving the first LBM data response, wherein enabling the user plane communications comprises establishing a periodicity of LBM messaging with the first RU;
transmitting, via the DU and based on the established periodicity, a second LBM data request based on a first media access control (MAC) address to a plurality of RUs comprising the first RU;
marking, via the DU, the first RU as non-responsive when a second LBM data response to the second LBM data request from the first RU is not received or the second LBM data response indicates an issue a consecutive predetermined number of times; and
establishing, via the DU, a second MAC address for communicating with the plurality of RUs when each of the plurality of RUs are marked as non-responsive, wherein the second MAC address is different from the first MAC address.

10. The apparatus of claim 9, wherein enabling the user plane communications comprises establishing the predetermined number of times with the first RU.

11. The apparatus of claim 9, wherein the DU comprises at least one baseband unit configured for control plane communications and the user plane communications with the plurality of RUs over a fronthaul (FH) interface, wherein the first LBM data request is transmitted to the first RU via the at least one baseband unit, wherein the first LBM data response is received from the first RU via the at least one baseband unit, and wherein the second LBM data request is transmitted to the plurality of RUs via the at least one baseband unit, and wherein the DU further comprises an RU manager unit configured for management plane communications with the plurality of RUs over the FH interface, wherein the user plane communications with the first RU are enabled via the RU manager unit, wherein the first RU is marked as non-responsive via the RU manager unit, and wherein the second MAC address is established for communicating with the plurality of RUs via the RU manager unit.

12. The apparatus of claim 11, the operations further comprising:
   transmitting, via the RU manager unit, a first LBM check to the at least one baseband unit, wherein the first LBM data request is transmitted to the first RU based on the first LBM check;
   receiving, via the RU manager unit, an acknowledgment responsive to the first LBM check from the at least one baseband unit;
   transmitting, via the RU manager unit, a first LBM query request to the first RU a first predetermined time after receiving the first acknowledgment; and
   receiving, via the RU manager unit, a first LBM query response responsive to the first LBM query request from the first RU, wherein the first LBM query response indicates whether the first LBM data response was received from the first RU, and wherein enabling the user plane communications with the first RU is based on receiving the first LBM query response.

13. The apparatus of claim 11, the operations further comprising:
   transmitting, via the RU manager unit, a second LBM check to the at least one baseband unit, wherein the second LBM data request is transmitted to the first RU based on the second LBM check;
   transmitting, via the RU manager unit, a second LBM query request to the first RU a second predetermined time after transmitting the second LBM check, wherein enabling the user plane communications comprises establishing the second predetermined time with the first RU; and
   receiving, via the RU manager unit, a second LBM query response responsive to the second LBM query request from the first RU, wherein the second LBM query response indicates whether the second LBM data response was received from the first RU.

14. The apparatus of claim 9, the operations further comprising:
   transmitting, via the DU, a suspension message to a system manager unit to suspend communications with the first RU when the first RU is marked as non-responsive;
   transmitting, via the DU, a restore message to a system manager unit to restore communications with the first RU when the second LBM data response is received and indicates a status of communications with the first RU is okay; and
   transmitting, via the DU, an interface switch message to the system manager unit to indicate communications with the plurality of RUs has switched to the second MAC address when each of the plurality of RUs are marked as non-responsive.

15. At least one non-transitory storage media storing instructions that, when executed by at least one processor, cause the at least one processor to perform operations comprising:
   transmitting, via a distributed unit (DU), a first loopback message (LBM) data request to a first radio unit (RU);
   receiving, via the DU, a first LBM data response from the first RU;
   enabling, via the DU, user plane communications with the first RU based on receiving the first LBM data response, wherein enabling the user plane communications comprises establishing a periodicity of LBM messaging with the first RU;
   transmitting, via the DU and based on the established periodicity, a second LBM data request based on a first media access control (MAC) address to a plurality of RUs comprising the first RU;
   marking, via the DU, the first RU as non-responsive when a second LBM data response to the second LBM data request from the first RU is not received or the second LBM data response indicates an issue a consecutive predetermined number of times; and
   establishing, via the DU, a second MAC address for communicating with the plurality of RUs when each of the plurality of RUs are marked as non-responsive, wherein the second MAC address is different from the first MAC address.

16. The least one non-transitory storage media of claim 15, wherein enabling the user plane communications comprises establishing the predetermined number of times with the first RU.

17. The least one non-transitory storage media of claim 15, wherein the DU comprises at least one baseband unit configured for control plane communications and the user plane communications with the plurality of RUs over a fronthaul (FH) interface, wherein the first LBM data request is transmitted to the first RU via the at least one baseband unit, wherein the first LBM data response is received from the first RU via the at least one baseband unit, and wherein the second LBM data request is transmitted to the plurality of RUs via the at least one baseband unit, and wherein the DU further comprises an RU manager unit configured for management plane communications with the plurality of RUs over the FH interface, wherein the user plane communications with the first RU are enabled via the RU manager unit, wherein the first RU is marked as non-responsive via the RU manager unit, and wherein the second MAC address is established for communicating with the plurality of RUs via the RU manager unit.

18. The least one non-transitory storage media of claim 17, the operations further comprising:
   transmitting, via the RU manager unit, a first LBM check to the at least one baseband unit, wherein the first LBM data request is transmitted to the first RU based on the first LBM check;
   receiving, via the RU manager unit, an acknowledgment responsive to the first LBM check from the at least one baseband unit;
   transmitting, via the RU manager unit, a first LBM query request to the first RU a first predetermined time after receiving the first acknowledgment; and
   receiving, via the RU manager unit, a first LBM query response responsive to the first LBM query request from the first RU, wherein the first LBM query response indicates whether the first LBM data response was received from the first RU, and wherein enabling the user plane communications with the first RU is based on receiving the first LBM query response.

19. The least one non-transitory storage media of claim 17, the operations further comprising:
   transmitting, via the RU manager unit, a second LBM check to the at least one baseband unit, wherein the second LBM data request is transmitted to the first RU based on the second LBM check;
   transmitting, via the RU manager unit, a second LBM query request to the first RU a second predetermined time after transmitting the second LBM check, wherein enabling the user plane communications comprises establishing the second predetermined time with the first RU; and receiving, via the RU manager unit, a second LBM query response responsive to the second LBM query request from the first RU, wherein the second LBM query response indicates whether the second LBM data response was received from the first RU.

20. The least one non-transitory storage media of claim 15, the operations further comprising:

transmitting, via the DU, a suspension message to a system manager unit to suspend communications with the first RU when the first RU is marked as non-responsive;

transmitting, via the DU, a restore message to a system manager unit to restore communications with the first RU when the second LBM data response is received and indicates a status of communications with the first RU is okay; and transmitting, via the DU, an interface switch message to the system manager unit to indicate communications with the plurality of RUs has switched to the second MAC address when each of the plurality of RUs are marked as non-responsive.

\* \* \* \* \*